(12) United States Patent
Sasaki et al.

(10) Patent No.: US 6,233,813 B1
(45) Date of Patent: May 22, 2001

(54) METHOD OF MANUFACTURING THIN FILM HEAD

(75) Inventors: Yoshitaka Sasaki, Yokohama; Atsushi Iijima, Saku, both of (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/087,973

(22) Filed: Jun. 1, 1998

(30) Foreign Application Priority Data

Nov. 11, 1997 (JP) .................................................... 9-308636

(51) Int. Cl.$^7$ .................................................... G11B 5/127
(52) U.S. Cl. .................................... 29/603.14; 29/603.15; 29/603.18; 216/22
(58) Field of Search .......................... 29/603.15, 603.14, 29/603.12, 603.25, 603.18; 216/22; 360/103, 113, 122, 126

(56) References Cited

U.S. PATENT DOCUMENTS

| | | | |
|---|---|---|---|
| 4,505,782 | * 3/1985 | Jacob et al. ........................... | 156/643 |
| 4,943,879 | * 7/1990 | Takano et al. ........................ | 360/126 |
| 5,277,750 | * 1/1994 | Frank ..................................... | 156/643 |
| 5,384,009 | * 1/1995 | Mak et al. ............................. | 156/662 |
| 5,438,747 | 8/1995 | Krounbi et al. . | |
| 5,452,164 | * 9/1995 | Cole et al. ............................. | 360/113 |
| 5,465,475 | * 11/1995 | Kinoshita et al. ..................... | 29/603 |
| 5,809,637 | * 9/1998 | Rottmayer ............................ | 29/603.15 |
| 5,872,693 | * 2/1999 | Yoda et al. ........................... | 360/126 |
| 5,916,423 | * 6/1999 | Westwood ........................ | 204/192.32 |
| 5,996,213 | * 12/1999 | Shen et al. ........................ | 29/603.15 |
| 6,029,339 | * 2/2000 | Chang et al. ..................... | 29/603.14 |

FOREIGN PATENT DOCUMENTS

| | | |
|---|---|---|
| 6-44528 | 2/1994 | (JP) . |
| 7-220245 | 8/1995 | (JP) . |
| 7-225917 | 8/1995 | (JP) . |
| 7-296331 | 11/1995 | (JP) . |

* cited by examiner

Primary Examiner—Gregory L. Huson
Assistant Examiner—Minh Trinh
(74) Attorney, Agent, or Firm—Oliff & Berridge, PLC.

(57) ABSTRACT

A method of manufacturing a thin film magnetic head, in which throat height TH of a pole portion and MR height MRH can be formed accurately to have desired design values for improving a surface recording density and reducing a side fringe magnetic flux during a writing, an MR film 46 is formed such that the film is embedded in a shield gap layer formed on a substrate, a first magnetic layer is formed on the shield gap layer, a thin film coil is formed on the first magnetic layer such that the coil is isolated by an insulating layer, and a second magnetic layer is formed in accordance with a given pattern. The gap layer is selectively removed by a reactive ion etching in the vicinity of side walls of a pole portion of the second magnetic layer, and then the first magnetic layer is partially removed by an ion milling to form a recess having an inner side wall which serves as a positional reference. An air bearing surface is polished on the basis of a position of this inner side wall of the recess.

16 Claims, 12 Drawing Sheets

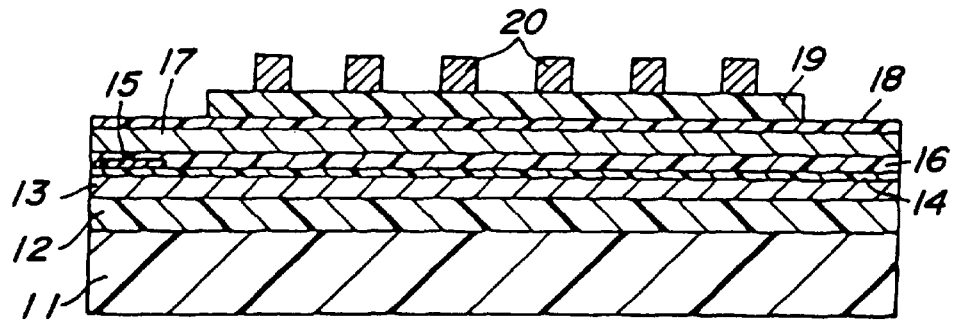
FIG_6 (PRIOR ART)
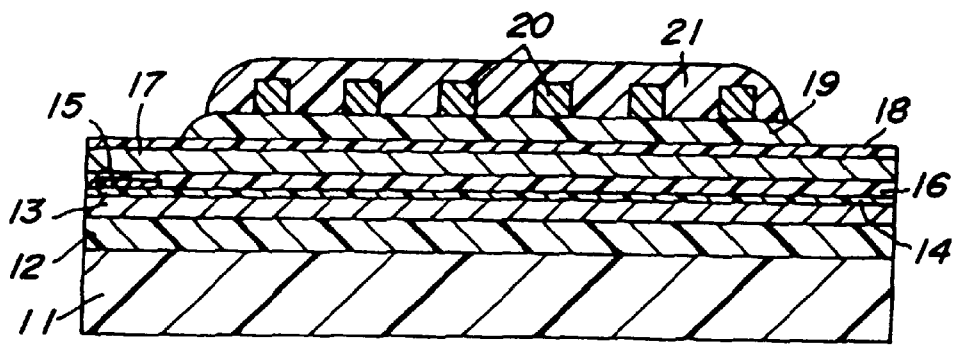
FIG_7 (PRIOR ART)
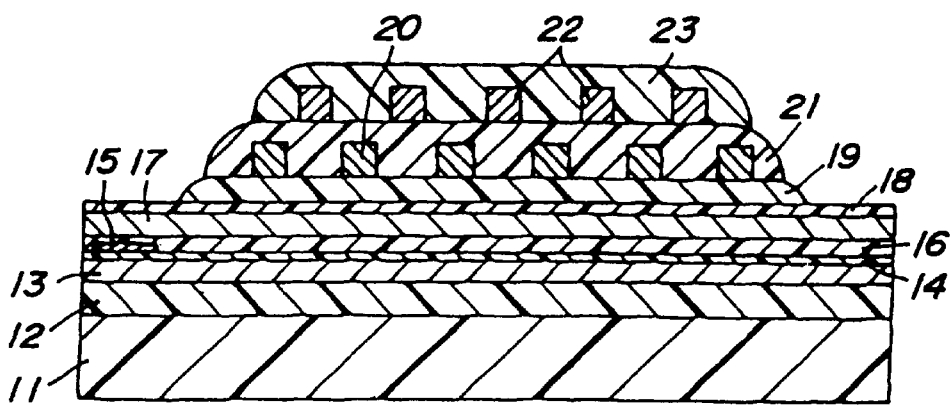
FIG_8 (PRIOR ART)

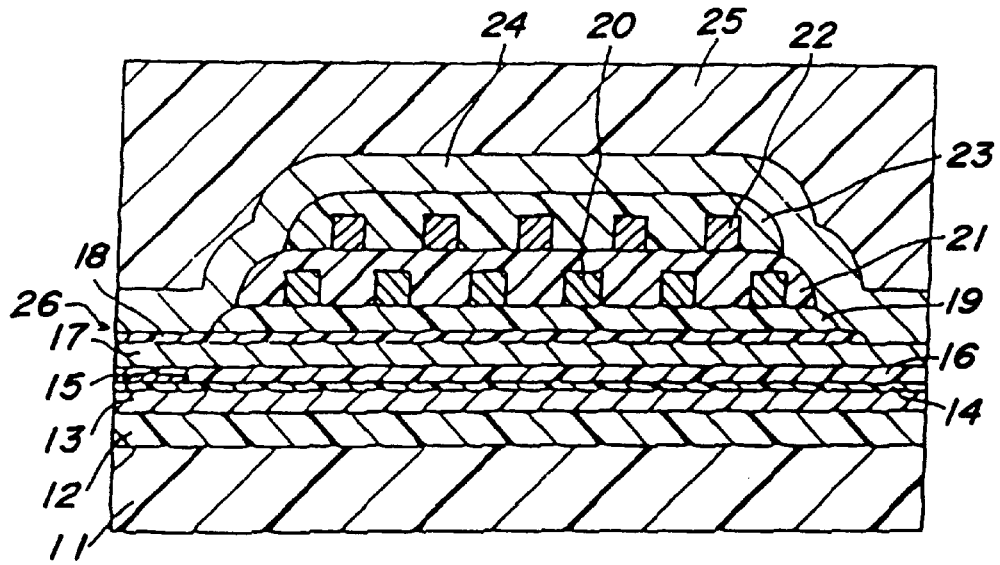
FIG_9 (PRIOR ART)
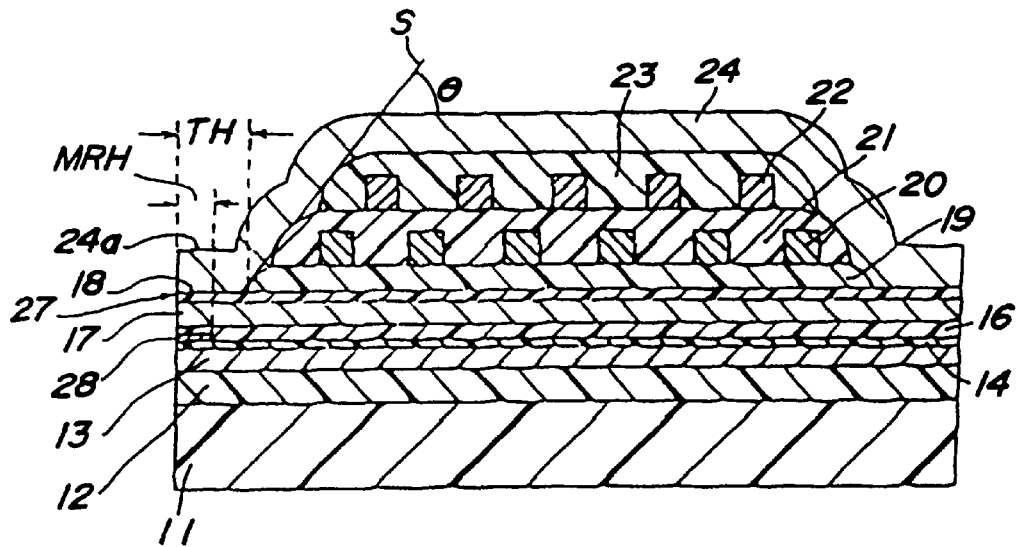
FIG_10 (PRIOR ART)

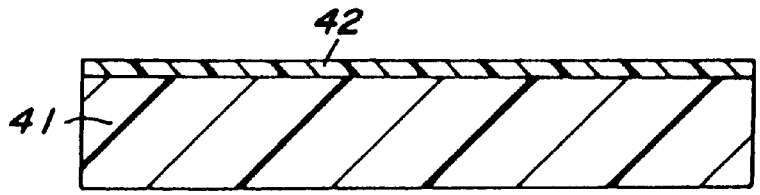
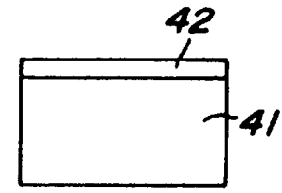
FIG._14A  FIG._14B
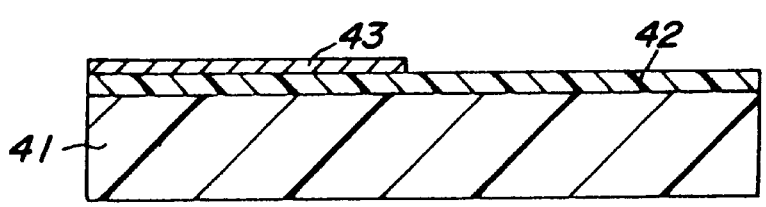
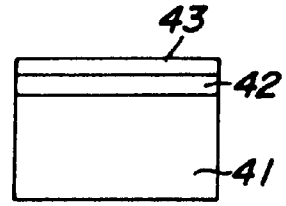
FIG._15A  FIG._15B
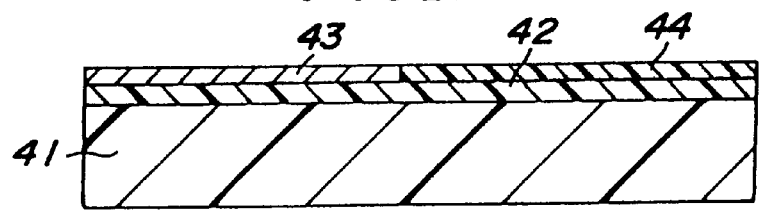
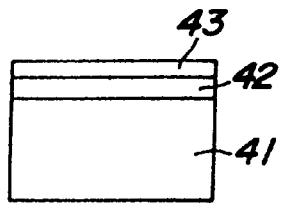
FIG._16A  FIG._16B
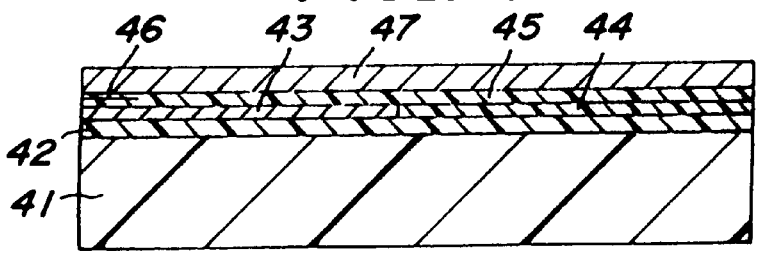
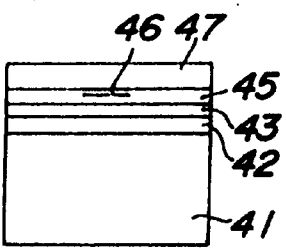
FIG._17A  FIG._17B
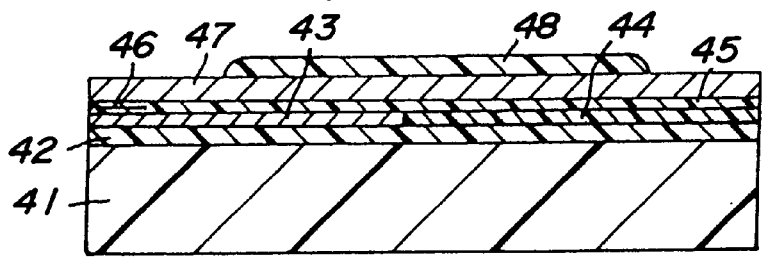
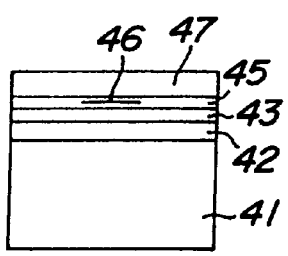
FIG._18A  FIG._18B

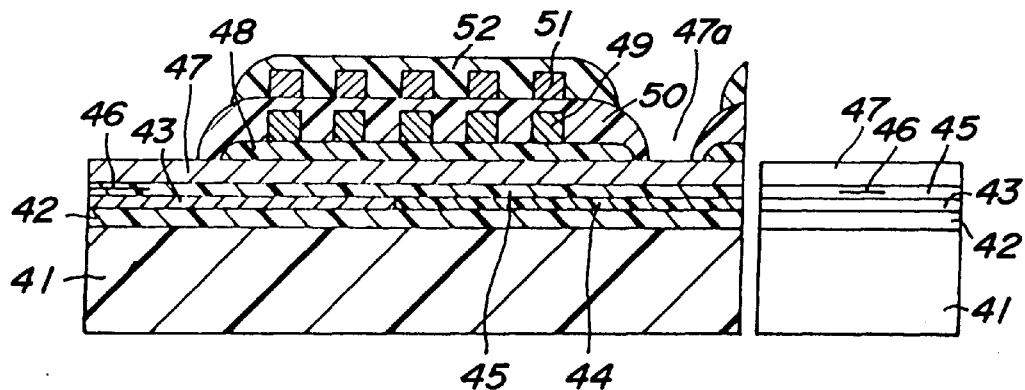
FIG._19A   FIG._19B
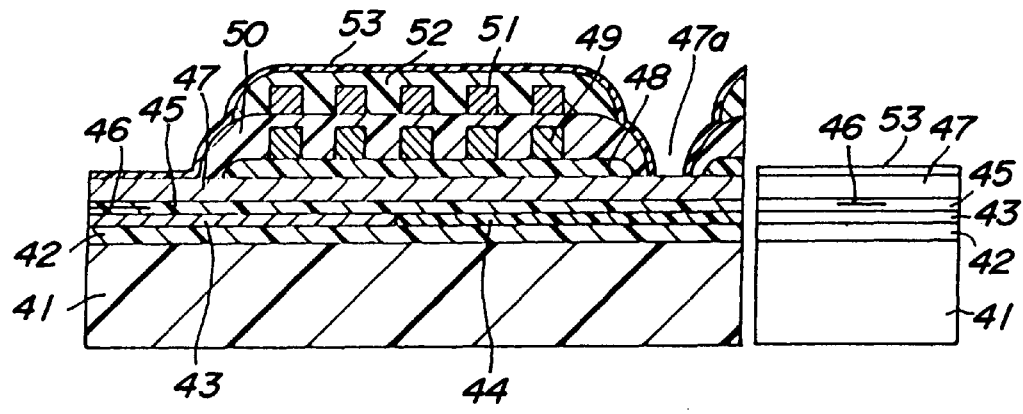
FIG._20A   FIG._20B
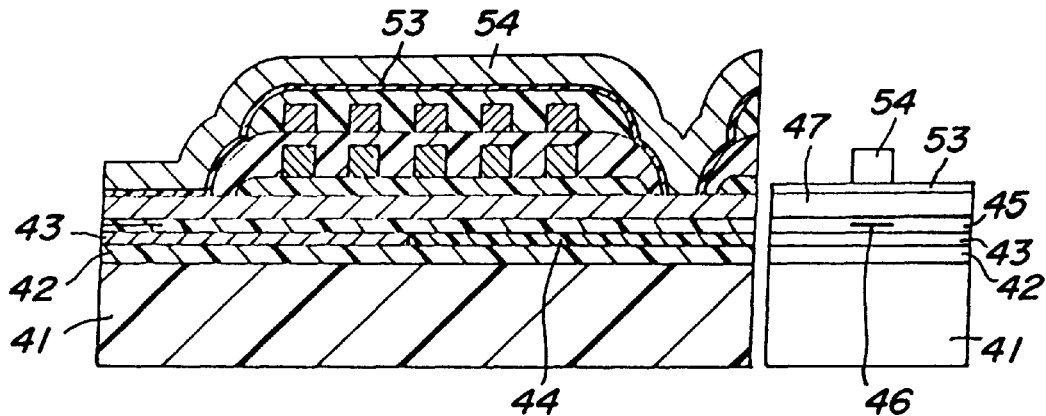
FIG._21A   FIG._21B

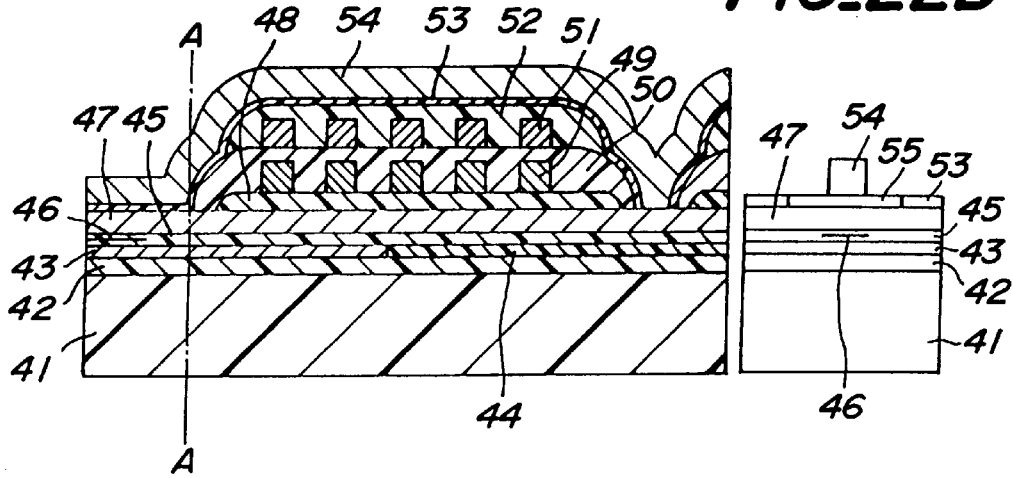
FIG._22A  FIG._22B
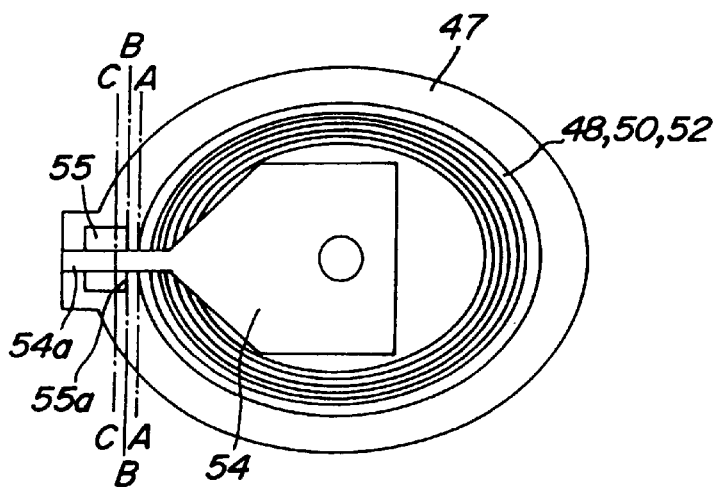
FIG._23

FIG. 26
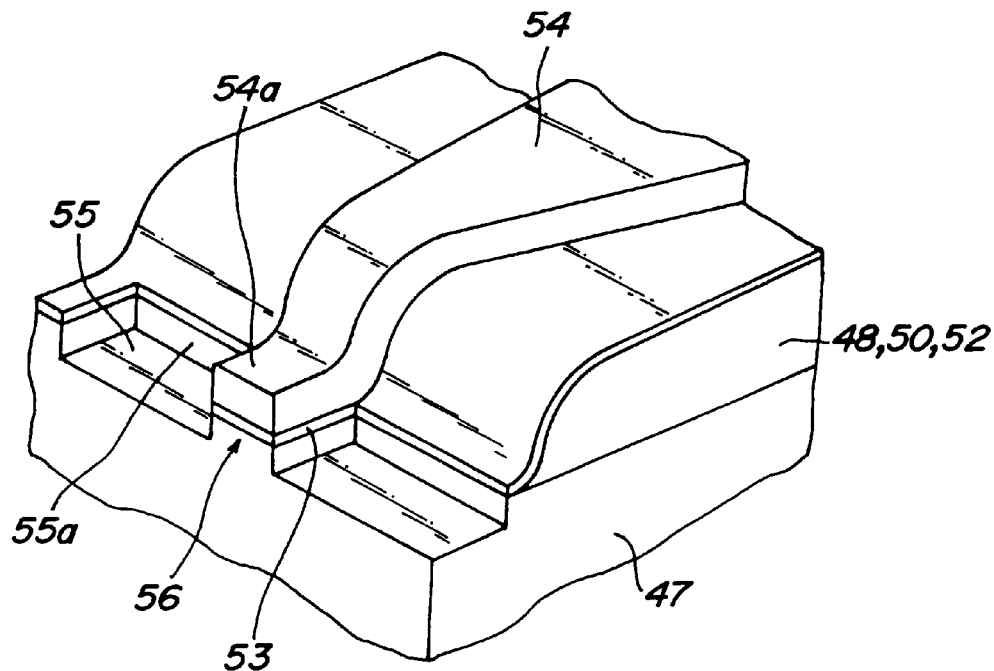
FIG. 27A
FIG. 27B
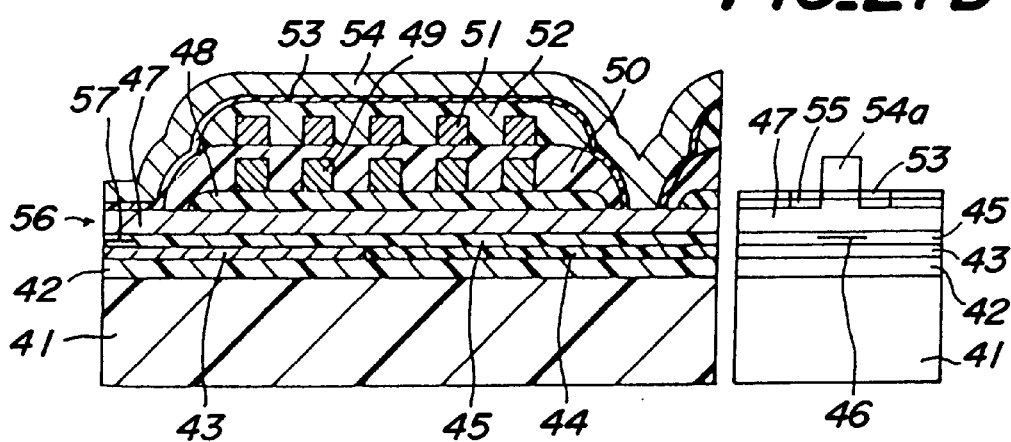

FIG_28
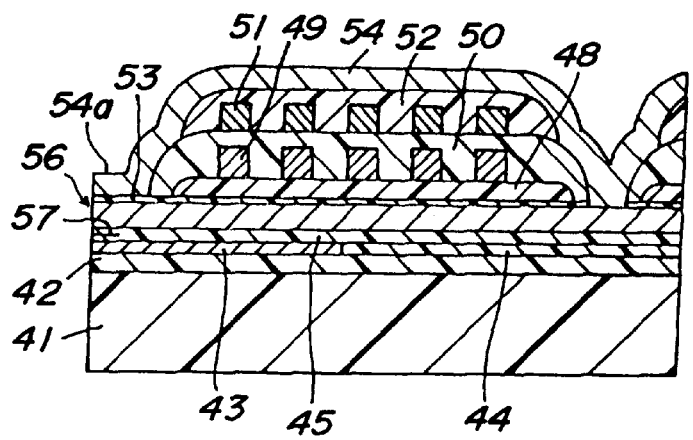
FIG_29
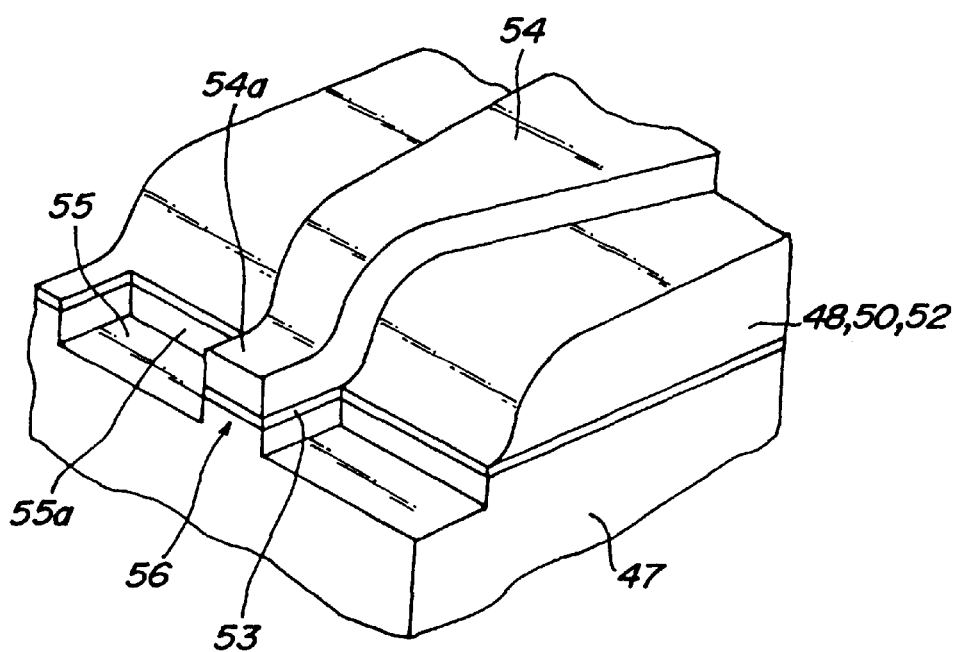

METHOD OF MANUFACTURING THIN FILM HEAD

BACKGROUND OF THE INVENTION

1. Field of the Invention

The present invention relates to a thin film magnetic head and a method of manufacturing the same, and more particularly to a composite type thin film magnetic head constructed by stacking an inductive type thin film writing magnetic head and a magnetoresistive type reading magnetic head one on the other and a method of manufacturing such a composite type thin film magnetic head.

2. Description of the Related Art

Recently a surface recording density of a hard disc device has been improved, and it has been required to develop a thin film magnetic head having an improved performance accordingly. In order to improve a performance of a reading magnetic head, a reproducing head utilizing a magnetoresistive effect has been widely used. As the reproducing magnetic head utilizing the magnetoresistive effect, an AMR reproducing element utilizing a conventional anisotropic magnetoresistive (AMR) effect has been widely used. There has been further developed a GMR reproducing element utilizing a giant magnetoresistive (GMR) effect having a resistance change ratio higher than the normal anisotropic magnetoresistive effect by several times. In the present specification, these AMR and GMR reproducing elements are termed as a magneto-resistive reproducing element or MR reproducing element.

By using the AMR reproducing element, a very high surface recording density of several gigabits per a unit square inch has been realized, and a surface recording density can be further increased by using the GMR element. By increasing a surface recording density in this manner, it is possible to realize a hard disc device which has a very large storage capacity of more than 10 gigabytes and is still small in size.

A height of a magnetoresistive reproducing element is one of factors which determine a performance of a reproducing head including a magnetoresistive reproducing element. This height is generally called MR Height, here denoted by MRH. The MR height MRH is a distance measured from an air bearing surface on which one edge of the magnetoresistive reproducing element is exposed to the other edge of the element remote from the air bearing surface. During a manufacturing process of the magnetic head, a desired MR height MRH can be obtained by controlling an amount of polishing the air bearing surface.

At the same time, a performance of a recording head is also required to be improved. In order to increase a surface recording density, it is necessary to make a track density on a magnetic record medium as high as possible. For this purpose, a width of a pole portion at the air bearing surface has to be reduced to a value within a range from several micron meters to several sub-micron meters. In order to satisfy such a requirement, the semiconductor manufacturing process has been adopted for manufacturing the thin film magnetic head.

One of factors determining a performance of an inductive type thin film writing magnetic film is a throat height TH. This throat height TH is a distance of a pole portion measured from the air bearing surface to an edge of an insulating layer which serves to separate a thin film coil from the air bearing surface. It has been required to shorten this distance as small as possible.

FIGS. 1–12 show successive steps of a known method of manufacturing a conventional typical thin film magnetic head and a completed magnetic head. This magnetic head belongs to a composite type thin film magnetic head which is constructed by stacking an inductive type thin film writing magnetic head and a magnetoresistive type thin film reading magnetic head one on the other. In a practical process of manufacturing the thin film magnetic head, a number of thin film magnetic heads are simultaneously formed on a single wafer, and therefore end faces of respective magnetic heads do not appear. However, for the sake of explanation, the end face is shown in the drawings.

At first, as illustrated in FIG. 1, on a substrate 11 made of an electrically insulating and non-magnetic material such as aluminum-titan-carbon (AlTiC), is deposited an insulating layer 12 made of alumina ($Al_2O_3$) and having a thickness of about 5–10 $\mu$m. Then, as depicted in FIG. 2, after forming a bottom shield layer 13 constituting a magnetic shield for the MR reproducing magnetic head and having a thickness of about 3 $\mu$m on the insulating layer, an insulating layer 14 is formed by depositing an alumina with a thickness of 100–150 nm as shown in FIG. 3.

As illustrated in FIG. 3, on the insulating layer 14, is formed a magnetoresistive layer 15 having a thickness of several tens nanometers (nm) and being made of a material having the magnetoresistive effect, and the magnetoresistive layer is shaped into a desired pattern by a precise mask alignment. Next, as represented in FIG. 4, an alumina insulating layer 16 like as the alumina insulating layer 14 is formed by sputtering to have a thickness of 100–150 nm, and then a magnetic layer 17 made of a permalloy and having a thickness of 3–4 $\mu$m is formed on the alumina insulating layer as shown in FIG. 5. This magnetic layer 17 serves not only as an upper shield layer for magnetically shielding the MR reproducing element together with the above mentioned bottom shield layer 13, but also as a bottom magnetic layer of the inductive type writing thin film magnetic head to be manufactured later. Here, for the sake of explanation, the magnetic layer 17 is called a first magnetic layer, because this magnetic layer constitutes one of magnetic layers forming the thin film writing magnetic head.

Next, as shown in FIG. 6, on the first magnetic layer 17, is formed a gap layer 18 made of a nonmagnetic material such as alumina to have a thickness of about 150–300 nm by sputtering. An electrically insulating photo-resist layer 19 is formed on the write gap layer 18 and is shaped into a desired pattern by a highly precise mask alignment. On the photo-resist layer there is formed a first thin film coil layer 20 made of, for instance copper.

Next, as illustrated in FIG. 7, an electrically insulating photo-resist layer 21 is formed on the first thin film coil layer 20 by an highly precise mask alignment, and then the photo-resist layer is baked at, for instance 250° C. in order to flatten its surface. On the thus flattened surface of the photo-resist layer 21, is formed a second thin film coil layer 22 and a photo-resist layer 23 is formed on the second thin film coil layer 22 by a highly precise mask alignment. Then, the photo-resist layer 23 is baked at, for instance 250° C. such that its surface is flattened as shown in FIG. 8. A reason for forming the photo-resist layers 19, 21 and 23 with a highly precise mask alignment as stated above is that the throat height TH and MR height MRH are defined on the basis of edge positions of these photo-resist layers.

Next, as illustrated in FIG. 9, on the gap layer 18 and photo-resist layers 19, 21 and 23, a second magnetic layer 24 made of a permalloy and having a thickness of 3–4 μm is selectively formed in accordance with a desired pattern. This second magnetic layer 24 is brought into contact with the first magnetic layer 17 at a position remote from the magnetoresistive layer 15, and the thin film coils 20, 22 pass through a closed magnetic path constituted by the first and second magnetic layers. A pole portion of the second magnetic layer 24 is formed into desired shape and size which define a track width. Furthermore, an overcoat layer 25 made of alumina is formed on exposed surfaces of the second magnetic layer 24 and gap layer 18 by sputtering. Finally, a side wall 26 at which the magnetoresistive layer 1 is formed is polished to form an air bearing surface (ABS) 27 as depicted in FIG. 10, said air bearing surface opposing to a record medium. During the formation of the air bearing surface 27, the magnetoresistive layer 15 is also polished to obtain an MR reproducing element 28. In this manner, the above mentioned throat height TH and MR height MRH are determined by the polishing. In an actual manufacturing process, contact pads for establishing electrical connections to the thin film coils 20, 22 and MR reproducing element 28 are formed, but these contact pads are not shown in the drawings.

FIGS. 10, 11 and 12 are cross sectional, front and plan views, respectively showing the known composite type thin film magnetic head manufactured in the above explained manner, while the overcoat layer 25 is dispensed with. It should be noted that in FIG. 10, the alumina insulating layers 14 and 16 surrounding the MR reproducing element 28 are denoted by a single insulating layer, and in the plan view of FIG. 12, the thin film coil 22 is denoted to have a concentric shape for the sake of simplicity. As clearly shown in FIG. 10, an angle θ between a straight line S connecting side edges of the photo-resist layers 19, 21 and 23 isolating the thin film coil 20, 22 and an upper surface of the second magnetic layer 24 is called an apex angle. This apex angle is one of important factors for determining a property of the thin film magnetic head together with the throat height TH and MR height MRH. Furthermore, as shown in the plan view of FIG. 12, a width W of the pole portion 24a of the second magnetic layer 24 is small. A width of tracks recorded on a record medium is determined by said width W, and therefore it is necessary to make this width W as small as possible in order to realize a high surface recording density.

As explained above, in order to improve the surface recording density on the magnetic record medium, it is necessary to improve a performance of the thin film recording magnetic head comprising the first and second magnetic layers 17 and 24, gap layer 18 and thin film coil 20, 22. In the composite type thin film magnetic head having the reading magnetic head using the magnetoresistive element and the thin film recording magnetic head stacked one on the other, it is necessary to improve the performance of the writing magnetic head as well as the reading magnetic head. In order to improve the performance of the writing magnetic head, it is important that the throat height TH and apex angle θ shown in FIG. 10 should be formed accurately such that they are not deviated from desired design values. However, in the known manufacturing method, it is difficult to control these parameters precisely and to manufacture the magnetic head in accordance with desired design values. That is to say, the throat height TH is defined by a distance from the air bearing surface 27 to an edge of the insulating layer 19 for isolating the thin film coil 20, 22, said edge opposing to the pole portion 24a of the second magnetic layer 24. However, in an actual manufacturing process, a position of said edge of the insulating layer 19 could not be clearly defined, and the air bearing surface 27 is polished on the basis of a throat height zero position defined by the edge position under an assumption that said edge would be formed at a desired position. During the formation of the thin film coil 20, 22, the heating process is carried out at about 250° C., and the photo-resist layer constituting the insulating layer is melt and a pattern of the insulating layer is varied. Therefore, a position of said edge of the insulating layer is deviated from a desired position, and thus a value of the throat height TH which corresponds to a length of the pole portion 24a and is determined by using a position of the edge of the insulating layer as a positional reference might be deviated from a desired design value. Particularly, when the photo-resist layers constituting the insulating layers 19, 21 and 23 are formed to have a large thickness, said deviation in the pattern might amount to a very large value such as about 0.5 μm. Therefore, a fine throat height TH of several micron meters to sub-micron meters could never be attained with a high reproducibility. Further, in case of using such a thick photo-resist layer, a desired pattern might be deviated by an unevenness in a thickness. For instance, in a composite type thin film magnetic head for a high frequency, a throat height TH has to be made not larger than 1.0 μm. The above mentioned deviation of 0.5 μm is very large and a number of defective throat heights TH are produced to decrease a manufacturing yield and a manufacturing cost is increased.

During the above mentioned heating process, the photo-resist film of the insulating layers 19, 21 and 23 is melt, and therefore a profile defined by side walls of these insulating layers as shown in FIG. 10 is varied and the apex angle θ is also varied. The apex angle θ influences the performance of the thin film magnetic head and the deviation in the apex angle might sometimes cause a defect in the property of the thin film magnetic head. In this manner, in the known method of manufacturing the thin film magnetic head, it is difficult to improve the performance of the writing magnetic head. Such a problem would be manifest in accordance with a progress in miniaturization of the thin film magnetic head.

The above explained demerit of the known method of manufacturing the thin film magnetic head is mainly due to the deviation in pattern of the photo-resist film caused by the process of heating the photo-resist film during the formation of the thin film coil 20, 22, but this process is inevitable for flattening the surface of the insulating layer and isolating the coil windings.

Furthermore, although the performance of the reading magnetic head can be improved by using a GMR reproducing element having a high sensitivity as the magnetoresistive element, in order to further increase a surface recording density, it is necessary to manufacture the magnetic head such that the MR height MRH defined by a height of the element measured from the air bearing surface 27 should not be deviated from a desired design value. In an actual manufacturing, the MR height MRH is determined by an amount of polishing the air bearing surface 27 like as the throat height TH, and this polishing is carried out while a position of the edge of the insulating layer is used as a positional reference. Since a position of the edge of the insulating layer is varied by the heating process as stated above, the MR height MRH is also varied and could not be formed to have a desired design value. Therefore, a manufacturing yield is decreased by the variation in the MR height MRH, and a manufacturing cost is increased.

Particularly, in a composite type thin film magnetic head including the writing magnetic head and the reading magnetic head having the magnetoresistive element stacked one on the other, a balance between the throat height TH of the writing magnetic head and the MR height MRH of the reading magnetic head has to be taken into consideration. These two factors are determined by a positional relationship of the insulating layers 19, 21 and 23 made of photo-resist, a precision in the mask alignment of the MR reproducing element and a precision in the polishing process for forming the air bearing surface. Therefore, a pattern alignment of the insulating layers 19 and 21 with respect to the MR layer 15 should be carried out with a minimum error. However, although this error could be minimum, there is still an error due to the deformation in a pattern of the photo-resist which constitutes the insulating layers 19, 21 and 23 isolating the coil windings of the thin film coil 20, 22 by the heating process, and thus the throat height TH and MR height MRH contain an error. Then, a balance between the writing magnetic head and the reading magnetic head is broken and it is no more possible to manufacture a composite type thin film magnetic head having a superior performance.

Moreover, as can be seen from FIG. 11, if a width of the first magnetic layer 17 and a width W of the pole portion 24a of the second magnetic layer 24 near the air bearing surface differ greatly from each other, there might be produced a leakage of a magnetic flux called a side fringe magnetic flux. Particularly, in the composite type thin film magnetic head having the recording thin film magnetic head and the MR reproducing head 28 formed integrally, the first magnetic layer 17 also serves as the magnetic shield for the MR reproducing head, a width of the first magnetic layer has to be inherently larger than a width W of the pole portion 24a of the second magnetic layer 24, and therefore there might be induced a relatively large side fringe magnetic flux. When such a side fringe magnetic flux is produced, an undesired side write phenomenon might occur and an effective width of a record track is increased. In accordance with a recent progress in the high surface recording density, a track width has been shortened. but when the above mentioned side write occurs, there might be produced a cross talk between adjacent tracks as well as an accidental erase of a magnetization pattern recorded in adjacent tracks, so that a sufficiently high surface recording density could not be realized.

In order to solve the above problems, there has been proposed to construct the trim structure by forming a protruded portion 17a in the first magnetic layer 17 as shown in FIG. 13 and this protruded portion is formed to have a width identical with a width of the pole portion 24a of the second magnetic layer 24. Such a solution has been described in Japanese Patent Application Laid-open Publications, Kokai Hei 7-220245, 7-225917 (corresponding to U.S. Pat. No. 5,438,747) and 7-296331.

Upon forming the protruded portion 17a in the first magnetic layer 17 shown in FIG. 13, in order to match a width of the protruded portion to a width of the pole portion 24a of the second magnetic layer 24, after forming the pole portion of the second magnetic layer, an ion beam etching, for instance an ion milling is performed while the pole portion of the second magnetic layer is used as a mask to remove the gap layer 18 and a portion of the first magnetic layer 17 is removed over a part of its thickness, for instance over about 500 nm. However, an etching rate of the ion milling for an alumina constituting the gap layer 18 is low such as about 30 nm/minute, and therefore a long processing time is required and a through-put is liable to be decreased.

Furthermore, an etching rate of the ion milling for a permalloy constituting the second magnetic layer 24 is high such as 200 nm/minute, and thus a thickness of the second magnetic layer 24 has to be larger by considering a reduction in thickness during the etching process. The second magnetic layer 24 is formed by a plating, and therefore if a thickness of the magnetic layer is larger, it is required to use a thick photo-resist film which is used for forming the pole portion 24a in accordance with a given pattern. When a thickness of the photo-resist film is large, it is difficult to narrow a width W of the pole portion 24a, and a pole portion having a width of an order of sub-micron meters could not be formed any more.

In order to form the protruded portion 17a having the same dimension as that of the pole portion 24a of the second magnetic layer 24 by etching the gap layer 18 and first magnetic layer 17 with the ion milling, while the pole portion 24a of the second magnetic layer 24 is used as a mask, an ion beam has to be made incident substantially at right angles. However, the ion milling is performed at right angles, debris of etched material might adhere to side walls of the protruded portion 17a of the first magnetic layer 17 and pole portion 24a of the second magnetic layer 24. By means of such adhered substances, the first and second magnetic layers 17 and 24 might be magnetically short-circuited and an effective track width might be increased. Therefore, the thin film magnetic head having a desired performance could not be attained.

SUMMARY OF THE INVENTION

The present invention has for its object to provide a novel and useful inductive type thin film magnetic head and a method of manufacturing the same, in which the above mentioned problems could be solved, a size of the magnetic head is decreased such that a high surface recording density can be attained while a desired performance is maintained, and throat height TH and apex angle θ accurately corresponding to desired design values can be obtained.

It is another object of the invention to provide a composite type thin film magnetic head and a method of manufacturing the same, in which a size of the magnetic head is decreased such that a high surface recording density can be attained while a desired performance is maintained, and throat height TH and apex angle θ accurately corresponding to desired design values can be obtained.

According to the invention, a thin film magnetic head comprises:

a first magnetic layer having a pole portion;

a second magnetic layer having a pole portion which constitutes an air bearing surface together with said pole portion of the first magnetic layer and has a width defining a record track width, said second magnetic layer being magnetically coupled with said first magnetic layer;

a gap layer made of a non-magnetic material and being interposed at least between said pole portion of the first magnetic layer and said pole portion of the second magnetic layer;

a thin film coil having a portion which is supported by an insulating layer in an electrically isolated manner; and a substrate supporting said first and second magnetic layers, gap layer, thin film coil and insulating layer supporting the thin film coil;

wherein a recess having an inner side wall which serves as a positional reference for said air bearing surface is formed on both sides of the pole portions of said first and second magnetic layers such that said recess penetrates through said gap layer and extends into the first magnetic layer over a part of a thickness of the first magnetic layer.

According to the invention, a method of manufacturing a thin film magnetic head comprises the steps of:

forming a first magnetic layer having a pole portion such that the first magnetic layer is supported by a substrate;

forming a thin film coil above said first magnetic layer such that the thin film coil is supported by an insulating layer in an electrically isolated manner;

forming a gap layer made of a non-magnetic material on at least said pole portion of the first magnetic layer and on said insulating layer;

forming a second magnetic layer having a pole portion which is opposed to said pole portion of the first magnetic layer via said gap layer;

performing an anisotropic etching to remove a portion of said gap layer adjacent to side edges of said pole portion of the second magnetic layer by using said pole portion of the second magnetic layer as a mask to form a recess in said gap portion;

performing an etching to remove a portion of said first magnetic layer by using said pole portion of the second magnetic layer as a mask such that said recess is dug down partially into the first magnetic layer; and polishing the substrate, pole portions of the first and second magnetic layers and gap layer sandwiched by these magnetic layers to form an air bearing surface which is to be opposed to a magnetic record medium, while an inner side wall of said recess is used as a positional reference.

Further, according to the invention, a method of manufacturing a thin film magnetic head comprises the steps of:

forming a first magnetic layer having a pole portion such that the first magnetic layer is supported by a substrate;

forming a gap layer made of a non-magnetic material on said first magnetic layer;

forming a thin film coil such that the thin film coil is supported by an insulating layer in an electrically isolated manner;

forming a second magnetic layer having a pole portion which is opposed to said pole portion of the first magnetic layer via said gap layer;

performing an anisotropic etching to remove a portion of said gap layer adjacent to side edges of said pole portion of the second magnetic layer by using said pole portion of the second magnetic layer as a mask to form a recess in said gap portion;

performing an etching to remove a portion of said first magnetic layer by using said pole portion of the second magnetic layer as a mask such that said recess is dug down partially into the first magnetic layer; and polishing the substrate, pole portions of the first and second magnetic layers and gap layer sandwiched by these magnetic layers to form an air bearing surface which is to be opposed to a magnetic record medium, while an inner side wall of said recess is used as a positional reference.

In the thin film magnetic head according to the invention, it is no more necessary to polish the air bearing surface by using a position of an edge of the insulating layer which supports the thin film coil in an electrically isolated manner as a positional reference, and the polishing process can be performed by using the inner side wall of the recess as a positional reference. A position of the inner side wall of the recess can be defined very accurately on the basis of a position of the edge of the insulating layer in regardless of a variation of a position of this edge, and moreover the inner side wall of the recess can be inspected under a microscope which is installed in a polishing machine during the polishing. Therefore, a position of the air bearing surface can be precisely determined, and a throat height TH which is identical with a length of the pole portion of the second magnetic layer can be formed accurately to follow a desired design value. In this manner, it is possible to attain the thin film magnetic head having an excellent performance.

Furthermore, in a composite type thin film magnetic head having a thin film writing magnetic head and a thin film reading magnetic film stacked one on the other, the above mentioned balance between the throat height TH and the MR height MRH can be always maintained to be a desired one, and the composite type thin film magnetic head having a high performance can be realized.

It should be noted that according to the invention, the pole portion of the first magnetic layer is formed into the trim structure, and therefore a leakage of a magnetic flux during writing, i.e. the side fringe magnetic flux can be reduced and a track width can be narrowed. Then, the thin film magnetic head according to the invention can realize a very high surface recording density.

In the method of manufacturing the thin film magnetic head according to the invention, after selectively removing by an anisotropic etching a portion of the gap layer while the pole portion of the second magnetic layer and a photo-resist layer formed on the gap layer are used as a mask to form the recess in the gap layer, a portion of the first magnetic layer exposed in the recess is etched by, for instance an ion milling such that the recess is dug down into the first magnetic layer over a part of a whole thickness of the first magnetic layer. An etching rate of the anisotropic etching for the gap layer is high such as 200 nm/minute, and therefore the etching process can be completed within a short time period and a high through put can be attained. Furthermore, during this anisotropic etching, a thickness of the pole portion of the second magnetic layer is not substantially reduced, and thus it is no more necessary to form this pole portion to have an unnecessarily large thickness. As a result thereof, a miniaturization can be attained and a width of the pole portion can be small.

In a preferable embodiment of the thin film magnetic head according to the invention, said insulating layer isolating a portion of the thin film coil situating between said first and second magnetic layers is covered with said gap layer made of a non-magnetic material. By surrounding the insulating layer of the thin film coil with the gap layer, a position of the edge of the insulating layer is hardly shifted, and therefore said inner side wall of the recess can be formed accurately with reference to a position of the edge of the insulating layer.

In another preferable embodiment of the thin film magnetic head according to the invention, the magnetic head is constructed as a composite type thin film magnetic head by providing a reading magnetoresistive element between said substrate and said first magnetic layer such that the magnetoresistive element is electrically isolated and magnetically shielded and an edge of the element is exposed on the air bearing surface.

In the method according to the invention, after selectively removing by an anisotropic etching a portion of the gap layer while the pole portion of the second magnetic layer and a photo-resist layer formed on the gap layer are used as a mask to form the recess in the gap layer, a portion of the first magnetic layer exposed in the recess is etched such that the recess is dug down over into the first magnetic layer over a part of a whole thickness of the first magnetic layer, and said etching is performed by an ion beam etching such as ion milling. By conducting the ion beam etching at an angle of 40–70°, particularly about 45° with respect to a normal to the first magnetic layer, debris of etched magnetic material is prevented from being applied again onto the side walls of the pole portion such that the first and second magnetic layers are scarcely short-circuited and an effective track width could not be increased.

BRIEF DESCRIPTION OF THE DRAWINGS

FIGS. 1–10 are cross sectional views showing successive steps of manufacturing a known composite type thin film magnetic head;

FIGS. 14A and 14B–22A and 22B are cross sectional views and front views showing successive steps of an embodiment of the thin film magnetic head manufacturing method according to the invention;

FIG. 23 is a plan view of the magnetic head;

FIG. 26 is a perspective view illustrating the pole portion of the thin film magnetic head having the air bearing surface;

FIGS. 27A and 27B are cross sectional view and front view, respectively of the magnetic head shown in FIG. 26;

FIG. 28 is a cross sectional views illustrating another embodiment of the thin film magnetic head according to the invention; and FIG. 29 is a perspective view showing a pole portion of the magnetic head shown in FIG. 28.

DESCRIPTION OF THE PREFERRED EMBODIMENT

Figure 1:
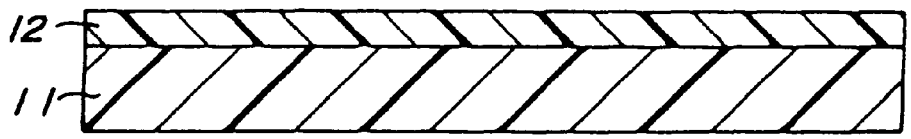
Figure 2:
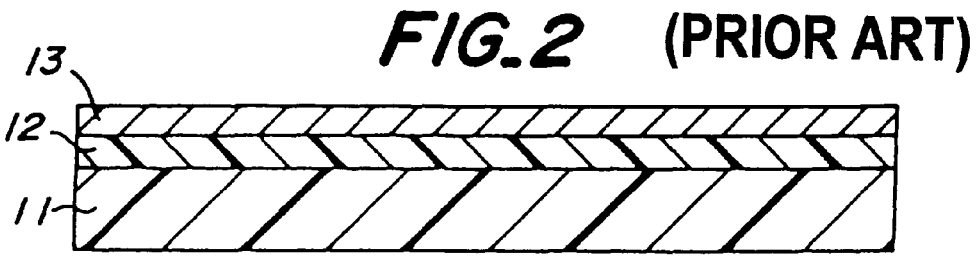
Figure 3:
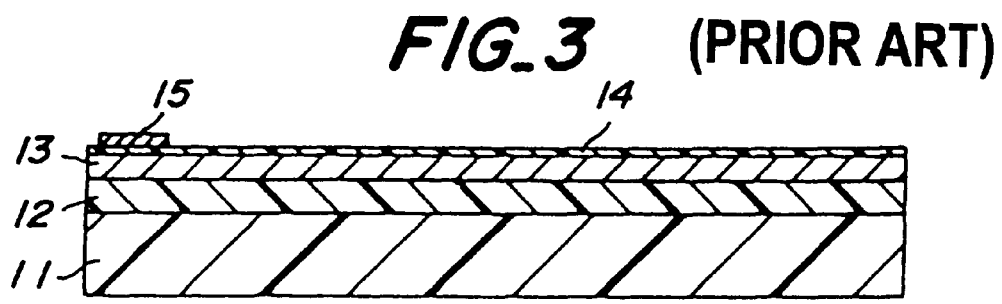
Figure 4:
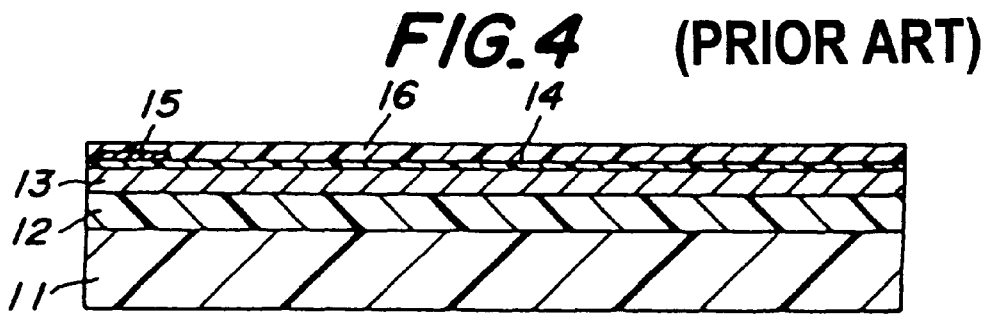
Figure 5:
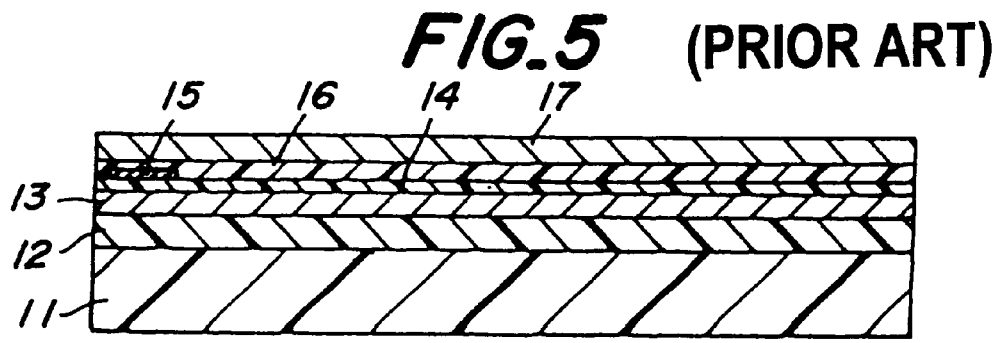
Figure 11:
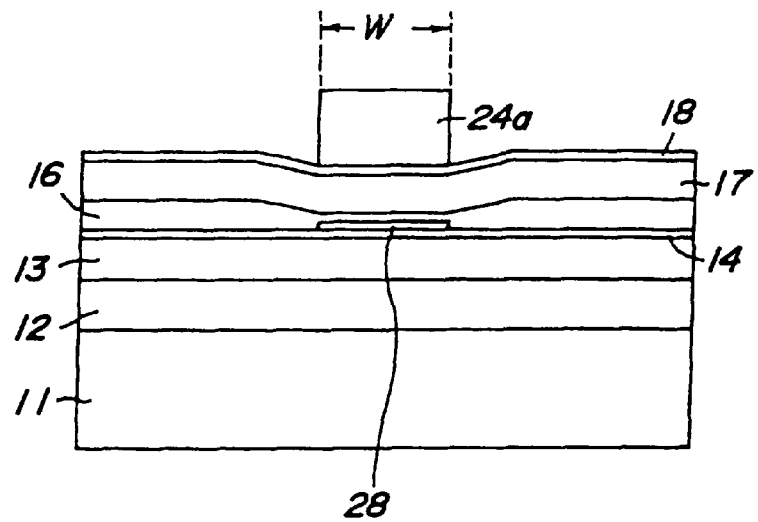
FIGS. 11 and 12 are front and plan views, respectively illustrating the known thin film magnetic head.
Figure 12:
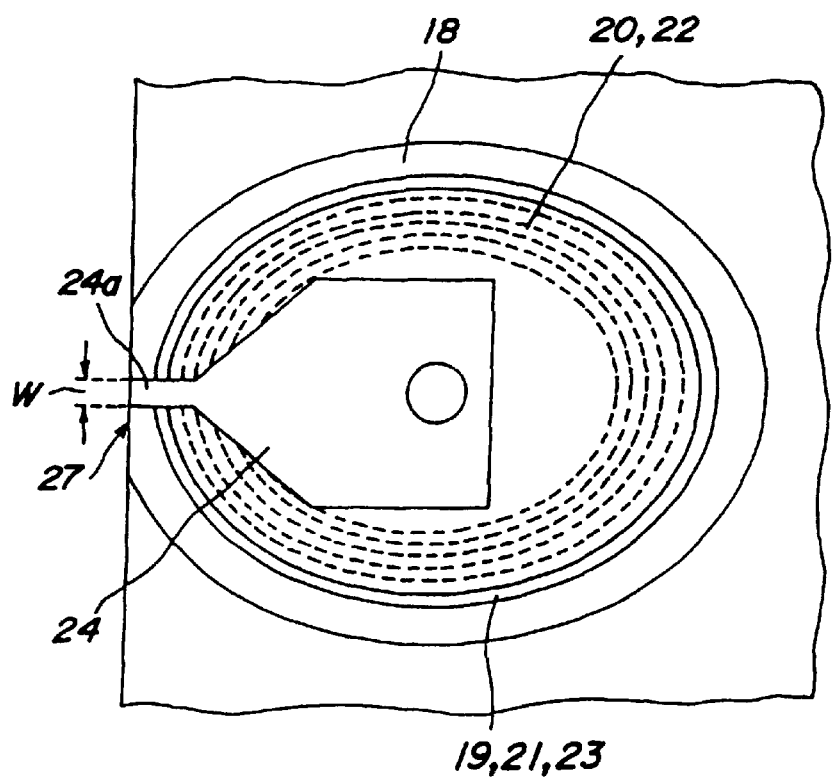
Figure 13:
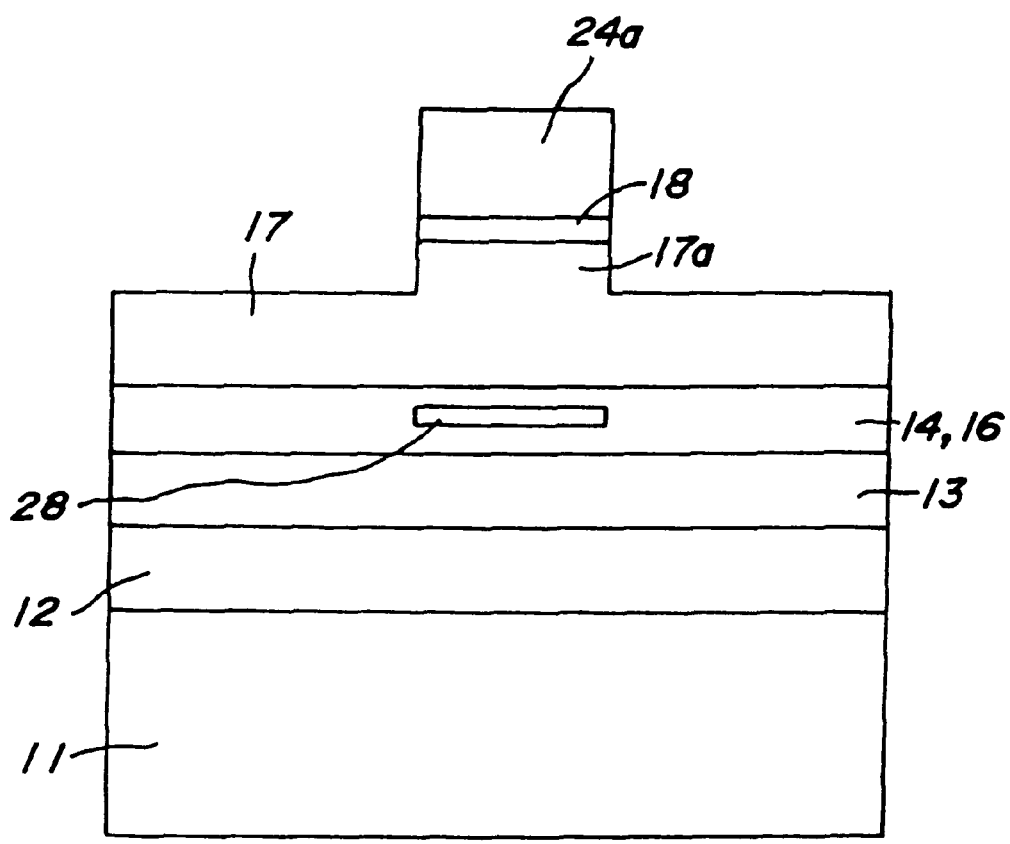
FIG. 13 is a front view illustrating a known thin film magnetic head having the pole portion with the trim structure.

FIGS. 14–26 show successive steps of an embodiment of the method of manufacturing the thin film magnetic head according to the invention. In FIGS. 14–22 and 26, A represents a cross sectional view and B illustrates a front view seen from a side of the air bearing surface. It should be noted that in these drawings, dimensions of various portions are not shown in accordance with actual dimensions. Furthermore, in an actual process for manufacturing the thin film magnetic head, since a number of thin film magnetic heads are formed in a wafer, an end face of the magnetic head is not exposed, but for the sake of explanation, an end face is shown in a front view.

At first, as shown in FIG. 14, on a substrate 41 made of an AlTiC and having a thickness of several millimeters, is deposited an insulating layer 42 made of an alumina having a thickness of about 3–5 µm. Next, as illustrated in FIG. 15, a permalloy layer 43 constituting a lower magnetic shield for an MR element is deposited to have a thickness of 3 µm by using a photo-resist film as a mask by means of a plating.

After forming an alumina layer 44 having a thickness of 4–6 µm on exposed surfaces of the permalloy layer 43 and alumina insulating layer 42, a surface is flattened by a mechanical polishing or chemical mechanical polishing (CMP) as depicted in FIG. 16.

Next, an MR film 46 having the magnetoresistive effect is formed in accordance with a desired pattern such that the MR film is embedded within a shield gap film 45. Then, a first magnetic layer 47 made of a permalloy and having a thickness of 3–4 µm is selectively formed on the shield gap layer, said first magnetic layer constituting a bottom pole of the thin film writing magnetic head. Further, in order to remove a step or steps formed in a surface, after forming an alumina layer having a thickness of 5–6 µm on the first magnetic layer, the chemical-mechanical polishing CMP is conducted to expose an flattened surface of the first magnetic layer as illustrated in FIG. 17. It should be noted that a pair of electrical conductors for constructing an electrical connection to the MR film 46 embedded in the shield gap layer 45 are formed, but the conductors are not shown in the drawing.

Next, an insulating layer 48 made of a photo-resist and defining an apex angle θ is formed in accordance with a given pattern as shown in FIG. 18. Then, as illustrated in FIG. 19, a thin film coil 49, 51 made of a copper is formed on the insulating layer 48 such that the thin film coil is supported by insulating layers 50 and 52 in an electrically isolated manner. Here, an recess 47a is formed in the insulating layers 48, 50, 52 for constituting a closed magnetic path by magnetically coupling the first magnetic layer 47 and a second magnetic layer in a later process. The thin film coil may be formed by an electroplating, and the electroplating method is identical with a known method and its explanation is dispensed with.

Next, as depicted in FIG. 20, a gap layer 53 made of an alumina and having a thickness of 150–300 nm is formed on the exposed surface of the first magnetic layer 47 and insulating layers 50, 52. In this case, the gap layer 53 is formed such that the first magnetic layer 47 is exposed in an opening 47a. Furthermore, after forming a second magnetic layer 54 having a thickness of 3–4 µm as shown in FIG. 21, the second magnetic layer is selectively removed by using a photo-resist layer having a desired width. The pole portion 54a has preferably a width not larger than 2 µm, particularly not larger than 1 µm.

During the formation of the second magnetic layer 54, a magnetic material is also deposited in the opening 47a, and the first and second magnetic layers 47 and 54 are magnetically coupled with each other via the opening. In the present embodiment, since the gap layer 53 is formed such that the insulating layers 50, 52 are covered with the gap layer, during a heating process for removing the photo-resist layer by ashing after patterning the second magnetic layer 54, the insulating layers 50, 52 are not removed and the thin film coil 49, 51 is neither exposed nor short-circuited.

According to the invention, it is also possible to form the gap layer 53 prior to the formation of the thin film coils 49, 52, but in this case, the surfaces of the insulating layers 50, 52 are covered with the gap layer 53. Therefore, in order to prevent the thin film coil from being exposed during the ashing process for the photo-resist film, the insulating layers 50, 52 may have a large thickness.

Figure 24:
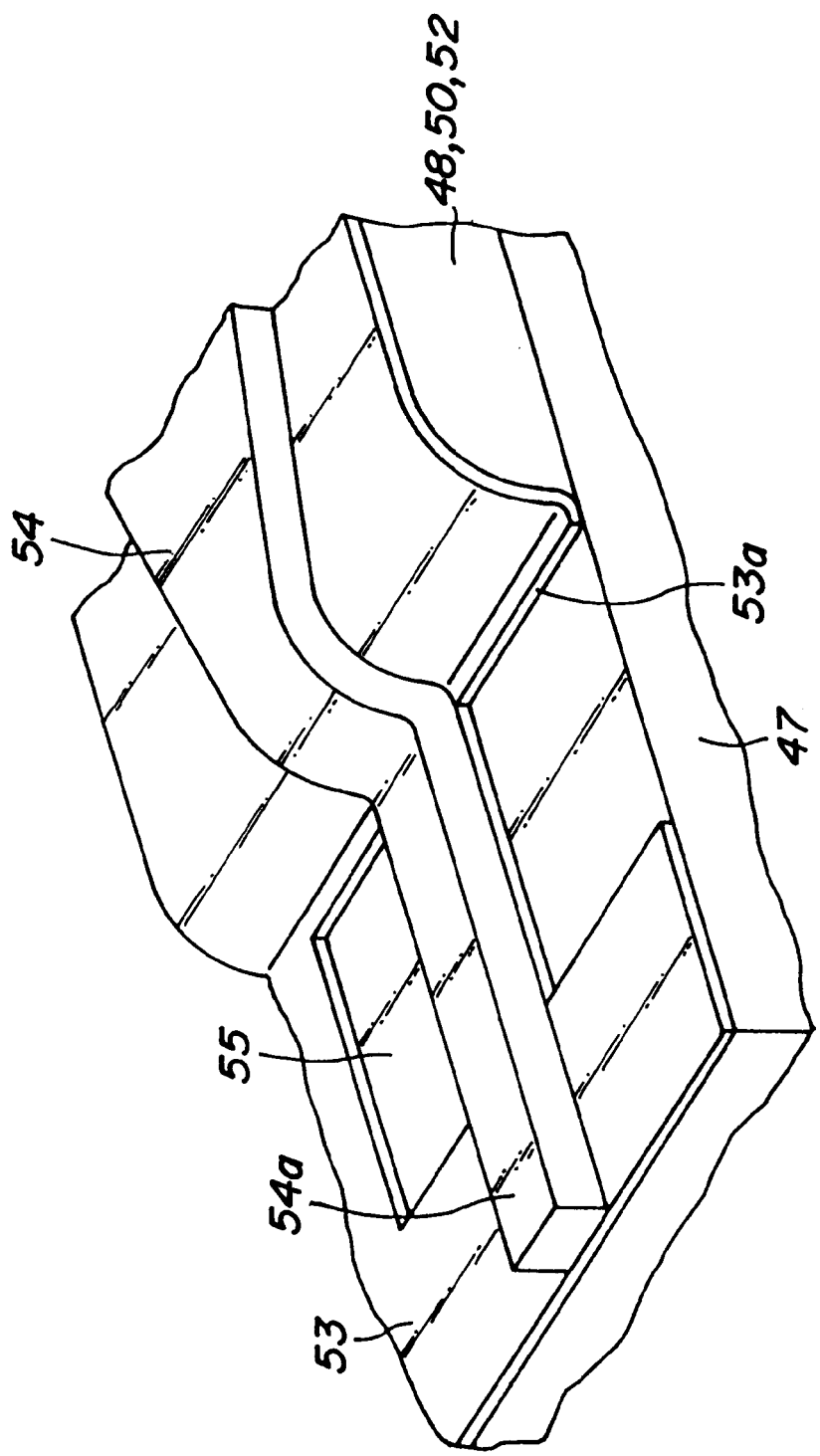
FIG. 24 is a perspective view depicting the recess formed in the vicinity of the pole portion.

Next, as shown in FIGS. 22–24, the gap layer 53 is partially removed to form a recess or opening 55 by an anisotropic etching, in the present embodiment a reactive ion etching (RIE) with a high density plasma source, while a photo-resist layer having a recess or opening formed in the vicinity of the pole portion 54a of the second magnetic layer 54 and side edges of the pole portion is used as a mask. The reactive ion etching may be conducted within an atmosphere of, for instance $CF_4$, $BCl_3$, $Cl_2$ or $BCL_3+Cl_2$. It is particularly preferable to perform the reactive ion etching within an atmosphere of $BCL_3$ or a mixture of $BCl_3$ and $Cl_2$. In case of using a mixture of $BCl_3$ and $Cl_2$, an amount of $Cl_2$ is preferably not higher than 50%.

An etching rate of the gap layer 53 made of an alumina for the reactive ion etching is high such as 100–300 nm/minute, and therefore an etching time of 1–2 minutes for forming the recess 55 in the gap layer 53 is sufficient. Furthermore, upon forming the recess 55, a line A—A passing through edges of the insulating layers 48, 50, 52 opposing to the pole portion, that is to say a position of the zero throat height is used as a positional reference such that a side wall of the recess 55 remote from the air bearing surface, i.e. an inner side wall 55a of the recess becomes coincided with a line B—B which is separated from the line A—A by a given distance. Since when the gap layer 53 is etched to form the recess 55, the overcoat layer (see FIG. 9) is not formed yet, the edges of the insulating layers 48, 50, 52 opposing to the pole portion can be seen by means of, for instance a microscope. Therefore, the position B—B of the inner side wall 55a of the recess 55 can be accurately formed by using the edges of the insulating layers as a positional reference.

Figure 25:
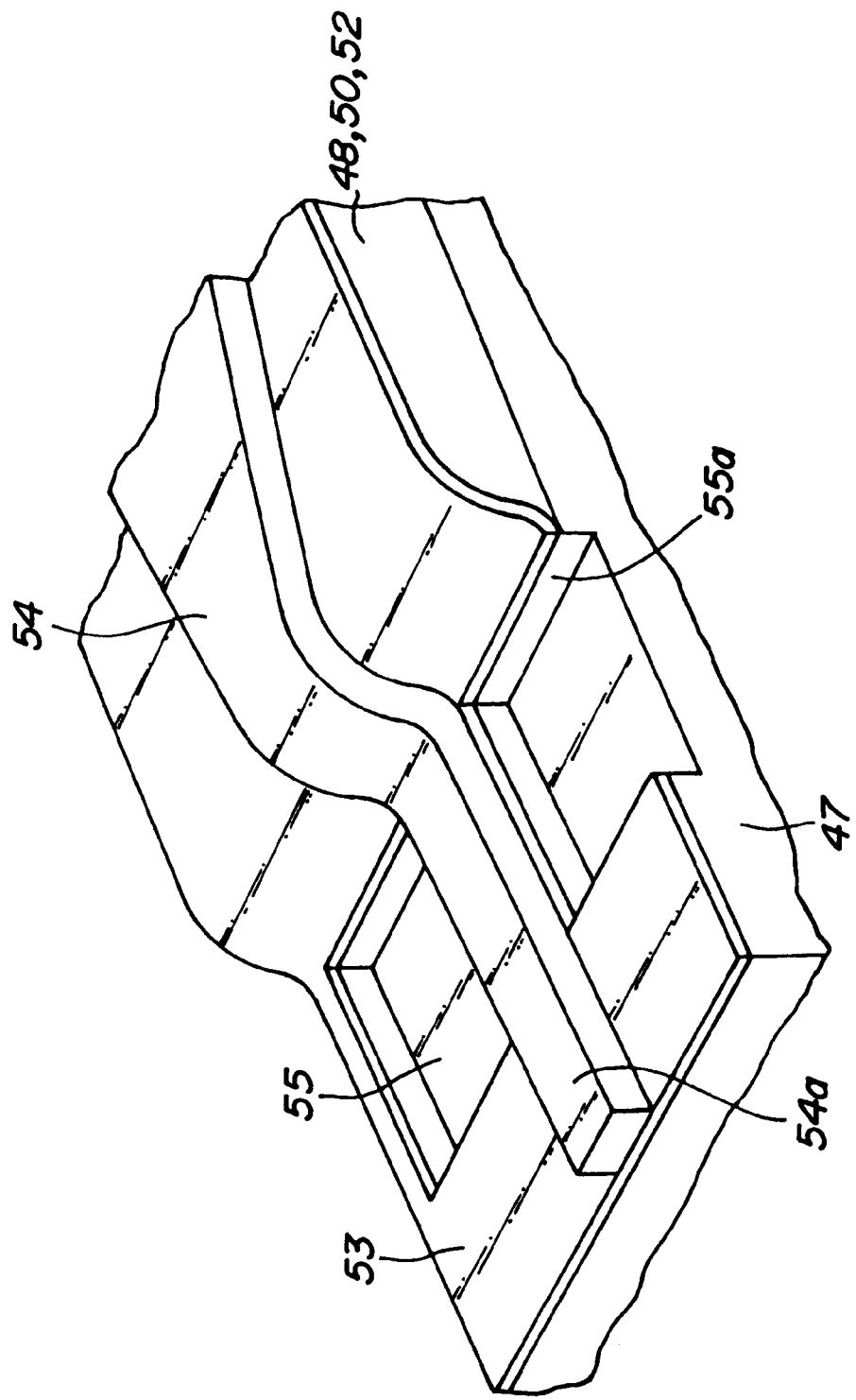
FIG. 25 is a perspective view showing a condition in which the recess is dug down into the underlying first magnetic layer over a part of a whole thickness thereof.

After forming the recess 55 by selectively removing the gap layer 53 by the anisotropic etching while the photo-resist layer formed on the pole portion 54a of the second magnetic layer 54 and the gap layer 53 as stated above, an ion beam etching is carried out while the photo-resist layer which has been used as a mask for the reactive ion etching is remained as it is. In this manner, the recess 55 is dug down partially into the first magnetic layer 47 to form the trim structure at the pole portion of the first magnetic layer as illustrated in FIG. 25. In the present embodiment, an ion milling is used as this ion beam etching, and the recess 55 is dug down into the first magnetic layer 47 over about 500–800 nm. By forming the trim structure, it is possible to prevent a side fringe magnetic flux leaked out of side walls of the pole portion 54a of the second magnetic layer 54, and the performance can be further improved.

The above mentioned anisotropic etching and ion milling are conducted while the pole portion 54a of the second magnetic layer 54 is used as a mask, and therefore upper edges of the pole portion are liable to be rounded off to a certain degree. However, this does not influence the performance of the magnetic head. Further, the photo-resist layer used in the RIE process may be removed prior to the etching process of ion-trimming the first magnetic layer 47. In this case, after digging down the recess partially into the first magnetic layer 47, the gap layer 53 is removed except for a portion under the second magnetic layer 54.

It has been known to form the trim structure in the surface of the first magnetic layer 47 by etching the first magnetic layer by the ion beam etching such as the ion milling. However, in the prior art technique, the ion beam is made incident upon the magnetic layer perpendicularly. When the ion beam is made incident upon the magnetic layer at right angles, magnetic materials are liable to be adhered to side walls and upper surface of the pole portion, and the first and second magnetic layer might be short-circuited and an effective track width might be increased. According to the invention, in order to remove such a problem, the ion beam is made incident upon the first magnetic layer at an incident angle of preferably of 40–70°, particularly about 45° with respect to a normal to the surface of the first magnetic layer. By performing the ion beam etching from such an inclined direction, the above mentioned adherence of magnetic material can be effectively prevented.

As explained above, in the present embodiment, upon forming the recess 55, since the gap layer 53 has been removed by the reactive ion etching, the etching process for partially removing the first magnetic layer 47 can be carried out from an inclined direction. Therefore, it is possible to realize a thin film magnetic head having a smaller effective track width, in which the adhesion of magnetic materials and the magnetic short-circuit between the first and second magnetic layers 47 and 54 can be avoided.

Next, the substrate 41, alumina insulating layer 42, bottom shield layer 43, shield gap layer 45, magnetoresistive film 46, first magnetic layer 47, gap layer 53 and second magnetic layer 54 are polished up to a position indicated by a line C—C in FIG. 23 to form an air bearing surface 56 as depicted in a perspective view of FIG. 26, a cross sectional view of FIG. 27A and a front view of FIG. 27B. During this polishing process, the inner side wall 55a of the recess 55 can be monitored with a microscope arranged on a polishing machine, and thus the polishing can be performed automatically and accurately while the inner side wall is used as a positional reference. In this manner, the pole portion 57 having an accurate dimension can be obtained. That is to say, the inner side wall 55a of the recess 55 is separated from the edges of the insulating layers 48, 50, 52 by a predetermined distance and the air bearing surface is formed on the basis of the inner side wall of the recess. Therefore, a distance from the edges of the insulating layers to the air bearing surface (a distance between the line A—A and the line B), that is to say a throat height TH can be formed accurately to have a desired design value. This throat height TH is preferable not longer than 2 μm, particularly not longer than 1 μm. According to the invention, the inner side wall 55a of the recess 55 has to be situated at a position which is inner than the air bearing surface 56, and the inner side wall 55a is still existent after the polishing process.

Moreover, the insulating layers 49, 50, 52 covering the thin film coil 49, 51 is covered with the gap layer 53 which is hardly affected by the heating process, and therefore a profile of the insulating layers is not varied and it is possible to obtain an apex angle θ which follows a desired design value. In this manner, the performance of the thin film writing magnetic head can be improved.

Further, according to the invention, the magnetoresistive film 46 is also polished during the polishing process for forming the air bearing surface 56 to form the MR reproducing element 57. As stated above, according to the invention, this polishing process is carried out by using a position of the inner side wall 55a of the recess 55 formed in the gap layer 53 as a reference position (line A—A) and this inner side wall is formed by using a position of the edge of the insulating layer 48, 50, 52 as a reference position, and therefore the MR height MRH can be also formed accurately to have a desired design value. Moreover, according to the invention, since a desired relationship cab always attained between the MR height MRH and the throat height TH, these parameters can be kept in an optimally balanced condition and a composite type thin film magnetic head can be obtained.

FIGS. 28 and 29 are cross sectional and perspective views showing another embodiment of the thin film magnetic head according to the invention. In the present embodiment, portions similar to those of the previous embodiment are denoted by the same reference numerals used in the previous embodiment. In the above embodiment, after forming the thin film coil 49, 51 isolated by the insulating layers 50, 52, the gap layer 53 is formed such that the insulating layers are covered with the gap layer. In the present embodiment, after forming the first magnetic layer 47, the gap layer 53 is formed, the insulating layer 48 is formed on the gap layer and then the thin film coil 49, 51 is formed such that the thin film is isolated by the insulating layers 50, 52. In this manner, by forming the gap layer 53 under the thin film coil 49, 51, in order to prevent the thin film coil from being exposed or short-circuited during the process of ashing a photo-resist layer serving as a mask for forming the recess, the insulating layers 50, 52 may be formed to be sufficiently thick.

The present invention is not limited to the above mentioned embodiments, but many alternations and modifications may be considered within the scope of the invention. For instance, in the above embodiments, the substrate is made of AlTiC which is a mixture of alumina-titan carbide, but the substrate may be made of other material such as alumina, Si, $SiO_2$, BN, ceramics and diamond-like carbon. Further, the magnetoresistive element may be GMR element instead of AMR element. Moreover, the gap layer 53 may be made of other non-magnetic material than alumina such as $SiO_2$, SiN and oxynitride. Furthermore, in the above explained embodiments, the magnetic layers 47, 54 is made of a permalloy which is an alloy based on Fe—Ni, but may be made of other magnetic material such as Co—Zr—Sn based alloy, FeZr—N based alloy, Fe—Ta—C based alloy, Co—Zr—Nb and FeN.

In the above embodiments, the thin film magnetic head is constructed as a composite type thin film magnetic head having the inductive type thin film writing magnetic head and MR reproducing element stacked one on the other, but it may be constructed as the inductive type thin film writing magnetic head.

Also in the above embodiments, the recess formed in the gap layer is dug down partially into the first magnetic layer by the ion milling, but according to the invention, any other ion beam etching may be utilized. Furthermore, this etching may be a reactive ion etching. In this case, after forming the opening in the gap layer by a reactive ion etching, the opening may be dug down partially into the first magnetic layer without interrupting the reactive ion etching, and thus a process becomes further simple.

In the thin film magnetic head and the method of manufacturing the same according to the invention, since the recess having the inner side wall which serves as a positional reference for the air bearing surface is formed in the gap layer at a portion adjacent to the pole portion of the second magnetic layer, it is possible to form the throat height TH to have a desired design value by polishing the air bearing surface on the basis of the inner side wall of the recess. In case of the composite type thin film magnetic head including the thin film reading magnetic head having the MR reproducing element, not only the MR height MRH can be accurately formed to have a desired design value, but also a good balance between the MR height MRH and the throat height TH can be always attained and the performance of the composite type thin film magnetic head can be easily improved.

The trim structure can be obtained by digging down the opening into the first magnetic layer over a part of a whole thickness thereof, and therefore an undesired leakage of a magnetic flux can be prevented. Upon forming the recess, the gap layer is removed by an anisotropic etching having a high etching rate for the gap layer material, an etching time can be shortened and a reduction in a thickness of the second magnetic layer during the etching can be decreased. Therefore, a width of the pole portion can be reduced and a very narrow track width of sub-micron order can be realized. Further, after removing the gap layer by an anisotropic etching, the first magnetic layer can be removed by an ion beam etching from an inclined direction, and thus the first and second magnetic layers can be effectively prevented from being magnetically short-circuited by an adhesion of magnetic materials and the performance of the thin film magnetic head can be improved.

Moreover, since the insulating layer isolating the thin film coil is covered with the gap layer, a pattern of the insulating layer is hardly deformed due to a melting of an edge of the insulating layer, and a position of the edge of the insulating layer serving as a positional reference for a throat height can be defined accurately. Since a position of the inner side wall of the recess is formed on the basis of said positional reference and the air bearing surface is polished on the basis of a position of the inner side wall of the recess, a throat height TH can be formed accurately. Furthermore, since a profile of the insulating layer covering the thin film coil is hardly deviated, an apex angle θ can be also formed to have a desired design value. Moreover, the MR element is formed also on the basis of the inner side wall of the recess, a desired positional relationship between the throat height TH and the MR height MRH can be always maintained, and a balance between these factors can be optimized.

As explained above, according to the invention, it is possible to provide a thin film magnetic head having a high performance, in which throat height TH, apex angle θ and MR height MRH are formed to have desired values. Particularly, according to the invention, it is possible to provide a miniaturized thin film magnetic head which can realize a narrow track width within a range from several micron meters to sub-micron meters. Upon manufacturing, it is possible to obtain a thin film magnetic head having desired design values, and thus a manufacturing yield is improved and a manufacturing cost can be reduced.

What is claimed is:

1. A method of manufacturing a thin film magnetic head, comprising the steps of:

forming a first magnetic layer having a pole portion such that the first magnetic layer is supported by a substrate;

forming a thin film coil above said first magnetic layer such that the thin film coil is supported by an insulating layer in an electrically isolated manner;

forming a gap layer made of an electrically insulating non-magnetic material on at least said pole portion of the first magnetic layer and on said insulating layer;

forming a second magnetic layer having a pole portion which is opposed to said pole portion of the first magnetic layer via said gap layer;

performing a reactive ion etching within an atmosphere of chlorine based gas to remove a portion of said gap layer adjacent to side edges of said pole portion of the second magnetic layer by using said pole portion of the second magnetic layer as a mask to form a recess;

performing an etching to remove a portion of said first magnetic layer by using said pole portion of the second magnetic layer as a mask such that said recess is dug down partially into the first magnetic layer; and polishing the substrate, pole portions of the first and second magnetic layers and gap layer sandwiched by these magnetic layers to form an air bearing surface which is to be opposed to a magnetic record medium, while an inner side wall of said recess is used as a positional reference.

2. A method of manufacturing a thin film magnetic head, comprising the steps of:

forming a first magnetic layer having a pole portion such that the first magnetic layer is supported by a substrate;

forming a gap layer made of an electrically insulating non-magnetic material on said first magnetic layer;

forming a thin film coil such that the thin film coil is supported by an insulating layer in an electrically isolated manner;

forming a second magnetic layer having a pole portion which is opposed to said pole portion of the first magnetic layer via said gap layer;

performing a reactive ion etching within an atmosphere of chlorine based gas to remove a portion of said gap layer adjacent to side edges of said pole portion of the second magnetic layer by using said pole portion of the second magnetic layer as a mask to form a recess;

performing an etching to remove a portion of said first magnetic layer by using said pole portion of the second magnetic layer as a mask such that said recess is dug down partially into the first magnetic layer; and polishing the substrate, pole portions of the first and second magnetic layers and gap layer sandwiched by these magnetic layers to form an air bearing surface which is to be opposed to a magnetic record medium, while an inner side wall of said recess is used as a positional reference.

3. The method according to claim 1, wherein said reactive ion etching is conducted within an atmosphere of an etching gas selected from the group consisting of $CF_4$, $BCl_3$, $Cl_2$ and $BCl_3+Cl_2$.

4. The method according to claim 1, wherein said reactive ion etching is conducted within an atmosphere including $BCL_3$ and $Cl_2$, a content of $Cl_2$ not exceeding 50%.

5. The method according to claim 1, wherein said etching for the first magnetic layer is performed by an ion beam etching.

6. The method according to claim 5, wherein said ion beam etching is conducted from a direction which is inclined with respect to a normal to the first magnetic layer by 40–70°, particularly about 45°.

7. The method according to claim 1, wherein the etching for the first magnetic layer is performed by a reactive ion etching.

8. The method according to claim 1, wherein an composite type thin film magnetic head is constructed by forming a reading magnetoresistive element between said substrate and said first magnetic layer in an electrically isolated and magnetically shielded manner.

9. The method according to claim 8, wherein a third magnetic layer for magnetic shielding is formed on said substrate, and after forming a magnetoresistive material film is formed on said third magnetic layer such that the magneto-resistive material film is embedded in a second insulating layer, said first magnetic layer is formed, and during the step of polishing said air bearing surface, said magnetoresistive material film is polished together with said third magnetic layer to form said magnetoresistive element whose side edge is exposed on the air bearing surface.

10. The method according to claim 2, wherein said reactive ion etching is conducted within an atmosphere of an etching gas selected from the group consisting of $CF_4$, $BCl_3$, $Cl_2$ and $BCl_3+Cl_2$.

11. The method according to claim 2, wherein the etching for the first magnetic layer is performed by a reactive ion etching.

12. A method of manufacturing a thin film magnetic head, comprising the steps of:

forming a first magnetic layer having a pole portion such that the first magnetic layer is supported by a substrate;

forming a thin film coil above said first magnetic layer such that the thin film coil is supported by an insulating layer in an electrically isolated manner;

forming a gap layer made of alumina on at least said pole portion of the first magnetic layer and on said insulating layer;

forming a second magnetic layer having a pole portion which is opposed to said pole portion of the first magnetic layers;

performing a reactive ion etching within an atmosphere of chlorine based gas to remove a portion of the gap layer adjacent to side edges of said pole portion of the second magnetic layer to form a recess and then to remove a portion of said first magnetic layer such that said recess is dug down partially into the first magnetic layer, during said reactive ion etching, said pole portion of the second magnetic layer being used as a mask; and polishing the substrate, pole portions of the first and second magnetic layers and gap layer sandwiched by these magnetic layers to form an air bearing surface which is to be opposed to a magnetic record medium, while an inner side wall of said recess is used as a positional references.

13. A method of manufacturing a thin film magnetic head, comprising the steps of:

forming a first magnetic layer having a pole portion such that the first magnetic layer is supported by a substrate;

forming a gap layer made of alumina on said first magnetic layer;

forming a thin film coil such that the thin film coil is supported by an insulating layer in an electrically isolated manner;

forming a second magnetic layer having a pole portion which is opposed to said pole portion of the first magnetic layer;

performing a reactive ion etching within an atmosphere of chlorine based gas to remove a portion of said gap layer adjacent to side edges of said pole portion of the second magnetic layer to form a recess and then to remove a portion of said first magnetic layer such that said recess is dug down partially into the first magnetic layer, during said reactive ion etching said pole portion of the second magnetic layer being used as a mask; and polishing the substrate, pole portions of the first and second magnetic layers and gap layer sandwiched by these magnetic layers to form an air bearing surface which is to be opposed to a magnetic record medium, while an inner side wall of said recess is used as a positional references.

14. The method according to claim 12, wherein said reactive ion etching is conducted within an atmosphere of an etching gas selected from the group consisting of $BCl_3$, $Cl_2$ and $BCl_3+Cl_2$.

15. The method according to claim 14, wherein said reactive ion etching is conducted within an atmosphere including $BCl_3$ and $Cl_2$, a content of $Cl_2$ not exceeding 50%.

16. The A method according to claim 13, wherein said reactive ion etching is conducted with an atmosphere of an etching gas selected from the group consisting of $BCl_3$, $Cl_2$ and $BCl_3+Cl_2$.

* * * * *